(12) United States Patent
Lee et al.

(10) Patent No.: US 7,578,554 B2
(45) Date of Patent: Aug. 25, 2009

(54) THIGH EXTENSION SYSTEM FOR A VEHICLE SEAT

(75) Inventors: Joel R. Lee, Homewood, IL (US); Jordan M. Mackey, Chicago, IL (US); Peter A. Sullivan, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 437 days.

(21) Appl. No.: 11/585,004

(22) Filed: Oct. 23, 2006

(65) Prior Publication Data
US 2007/0108817 A1 May 17, 2007

Related U.S. Application Data

(60) Provisional application No. 60/737,679, filed on Nov. 17, 2005.

(51) Int. Cl.
*A47C 3/00* (2006.01)
(52) U.S. Cl. .................... 297/284.11; 297/337
(58) Field of Classification Search ............ 297/284.11, 297/337, 353, 411.36
See application file for complete search history.

(56) References Cited
U.S. PATENT DOCUMENTS

| 5,380,063 | A  | * | 1/1995 | Dauphin | 297/284.11 |
| 6,106,063 | A  | * | 8/2000 | Dauphin | 297/284.11 |
| 6,189,971 | B1 | * | 2/2001 | Witzig  | 297/284.11 |
| 6,767,062 | B2 | * | 7/2004 | Piretti | 297/337 |
| 6,863,346 | B2 | * | 3/2005 | Zund    | 297/337 |
| 6,890,030 | B2 | * | 5/2005 | Wilkerson et al. | 297/284.11 |
| 6,994,400 | B2 | * | 2/2006 | Koepke et al. | 297/337 |

* cited by examiner

*Primary Examiner*—Anthony D Barfield
(74) *Attorney, Agent, or Firm*—Mark W. Croll; Paul F. Donovan

(57) ABSTRACT

A system configured to allow adjustment of a vehicle seat includes a securing bracket, an extension bracket, and a latching member. The securing bracket is configured to be secured to structure within a vehicle, and includes an adjustment guide track having a plurality of recessed grooves separated by a plurality of teeth or ribs. The extension bracket is movably secured to the securing bracket and includes a fixed arm track, a lever engaging arm positioned within the arm track, and a lever operatively connected to the lever engaging arm. The engaging arm includes a curved channel. The latching member includes a boss or knob and a protuberance. The boss is positioned within the curved channel. The protuberance is configured to be retained within each of the recessed grooves. Movement of the lever engaging arm in a first linear direction causes the latching member to move in a second linear direction that is perpendicular to the first linear direction.

19 Claims, 6 Drawing Sheets

THIGH EXTENSION SYSTEM FOR A VEHICLE SEAT

RELATED APPLICATIONS

This application relates to and claims priority benefits from U.S. Provisional Patent Application No. 60/737,679 entitled "Thigh Extender Break Away Feature For Automobile Seat," filed Nov. 17, 2005, which is hereby incorporated by reference in its entirety.

FIELD OF THE INVENTION

Embodiments of the present invention generally relate to a vehicle seat, and more particularly to a system for adjusting the seat to provide additional thigh support.

BACKGROUND OF THE INVENTION

Many modern vehicle seats include thigh extenders to provide additional comfort for drivers and passengers alike. Some modern vehicles are equipped with seat memory devices configured to adapt a seat position to a particular driver. The seat may be oriented in an uncomfortable position, however, if the memory device malfunctions, or if a prior driver is not the same size as a subsequent driver. This situation may frequently arise, for example, with rental cars, in which numerous drivers drive the same vehicle.

A thigh extender may cause the thighs of a driver to be pinched between the extendable seat portion and another structure, such as a steering wheel. Conventional thigh extender systems include a release lever that is employed to allow the extendable or adjustable seat portion to be extended and retracted. Once the seat portion is locked in position, however it may be prevented from moving until the release lever is engaged. Thus, a subsequent driver may find that his/her thighs are uncomfortably pinched between the seat portion and the steering wheel or dashboard. The subsequent driver may not be able to determine that his/her thighs will be pinched until after he/she sits in the vehicle seat.

Additionally, during sudden acceleration or deceleration, such as during a collision, the seat portion may be forced into a position not chosen by the driver or passenger. Depending on the direction of the force, the occupant's thighs may be pinched between the seat portion and the steering wheel or dashboard, or the seat portion may retreat into the seat assembly. In either case, the occupant's thighs may be subjected to discomfort.

Thus, a need exists for a thigh extender system that provides a comfortable fit for a driver or passenger. Further, a need exists for a thigh extender system that remains in position after an occupant has adjusted the seat to his/her preference.

SUMMARY OF THE INVENTION

Certain embodiments of the present invention provide a thigh extender system for a vehicle seat. The system includes a securing bracket, an extension bracket, and a latching member. The securing bracket includes a toothed guide track, which may be a gear track having alternating teeth and grooves.

The extension bracket is movably secured to the securing bracket and includes a lever engaging arm and a lever operatively connected to the lever engaging arm. The lever engaging arm includes a curved channel.

The latching member includes a main body having a knob, boss, or the like extending from a surface of the main body, and a protruding tip, tab, barb, or the like extending from an end of the main body. The knob is positioned within the curved channel. The protruding tip is configured to be retained by the toothed guide track. That is, the tip may be secured within a groove of the track. Movement of the lever engaging arm in a first linear direction, such as over directions parallel to a longitudinal axis of the lever engaging arm, causes the latching member to move in a second linear direction, such as over directions parallel to a latitudinal axis of the lever engaging arm, that is perpendicular to the first linear direction.

The extension bracket may also include a fixed arm track. The lever engaging arm may be positioned within the fixed arm track, wherein the fixed arm track prevents the lever engaging arm from moving in the second linear direction.

The curved channel prevents the knob from moving in the second linear direction when the latching member is in a locked position. The protruding tip is in the locked position when it is retained within the toothed guide track.

Movement of the lever engaging arm in the first linear direction causes the knob to move through the curved channel. Movement of the curved channel over the knob causes the knob to move away from the toothed guide track in the second linear direction so that the knob, and the latch member, are in an unlocked position with respect to the toothed guide track.

The system may also include a biasing member operatively connected to the protruding tip. The biasing member exerts a force into the protruding tip so that the protruding tip extends outwardly from the latching member. As such, the protruding tip is moved into a breakaway position in which the protruding tip retracts into the latching member when the protruding tip is forced inward. The biasing member may be configured to allow the protruding tip to retract into the latching member only when a predetermined force is exerted into the protruding tip. The biasing member may be a spring. The spring compresses in the breakaway position. The extension bracket is able to move with respect to the securing bracket in the first linear direction when the protruding tip is in the breakaway position.

The lever engaging arm may also include a stop member configured to engage a portion of the extension bracket to limit movement of the lever engaging arm in the first linear direction. The stop member may be a clip, block, clasp, barb, latch or the like. The stop member ensures that the lever engaging arm does not eject from the extension bracket.

Figure 1:
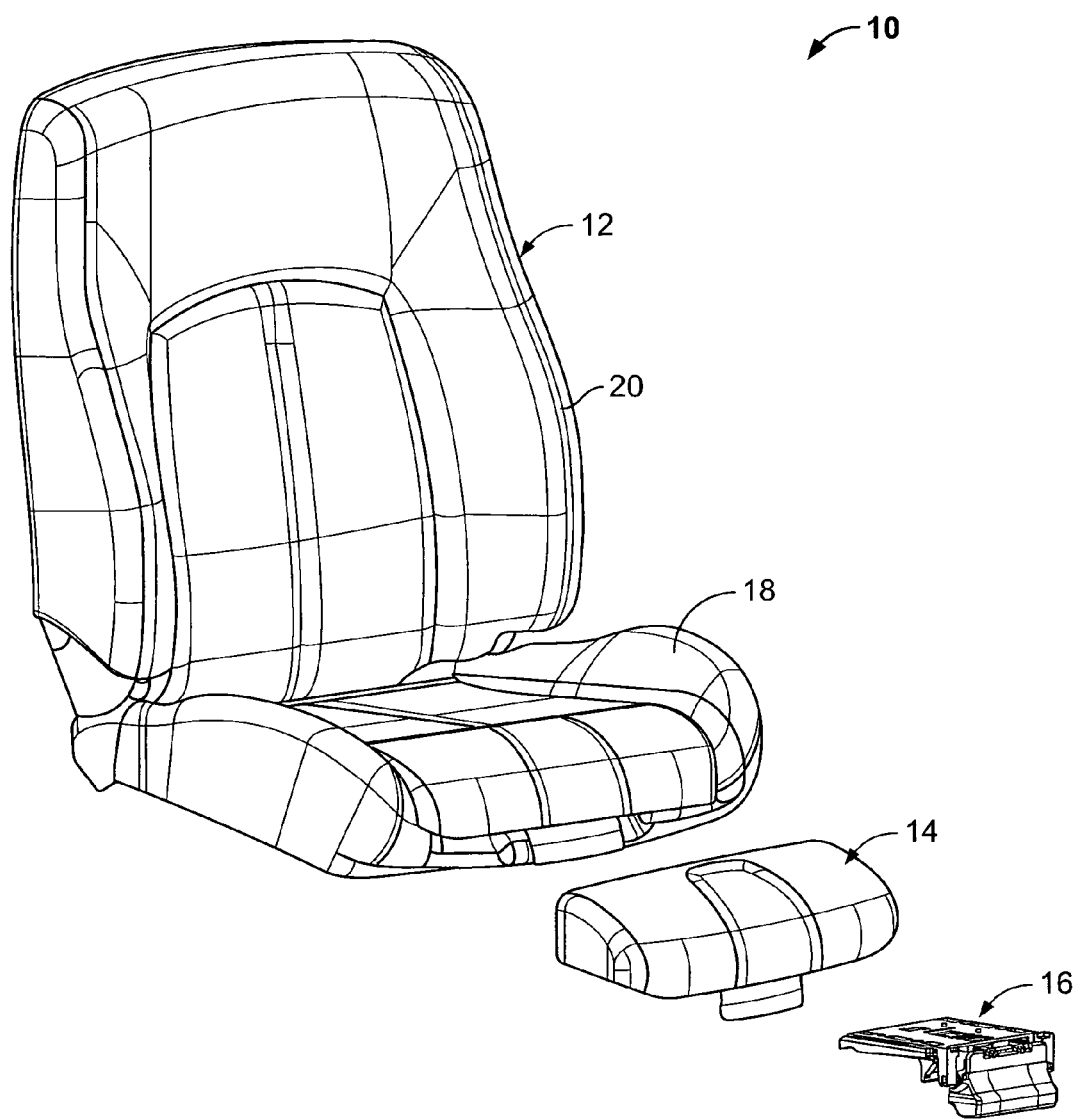
FIG. 1 illustrates an isometric exploded view of a vehicle seat assembly according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 illustrates an isometric exploded view of a vehicle seat assembly 10 according to an embodiment of the present invention. The vehicle seat assembly 10 includes a main seat 12, an extendable thigh support 14, and an extension system 16.

The main seat 12 includes a lower body support seat 18 connected to a backrest 20. The extendable thigh support 14 is secured to the lower body support seat 18 through the extension system 16, which allows the extendable thigh support 14 to move with respect to the lower body support seat 18 and/or a fixed frame.

Figure 2:
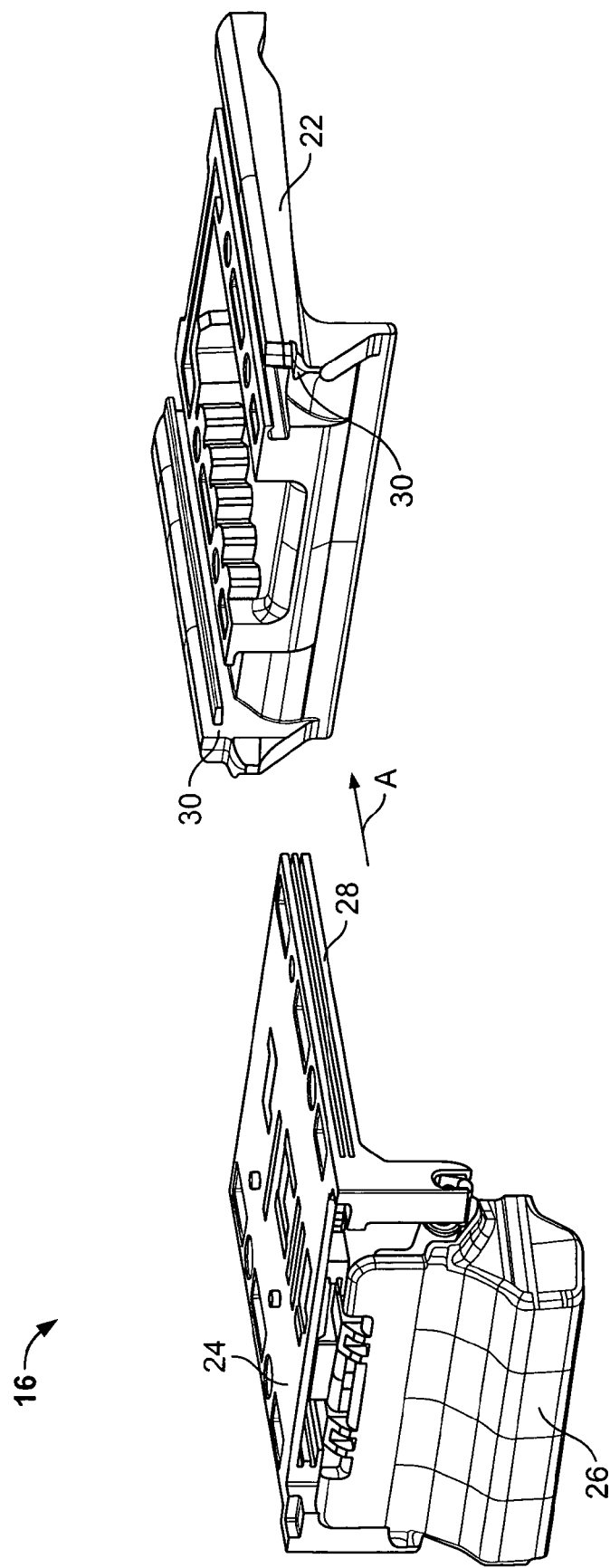
FIG. 2 illustrates an isometric exploded view of an extension system according to an embodiment of the present invention.

FIG. 2 illustrates an isometric exploded view of the extension system 16. The extension system 16 may be formed of plastic and/or metal. The extension system includes a securing bracket 22 and an extension bracket 24. The securing bracket 22 may be configured to be securely fixed to a portion of the lower body support seat 18 (shown in FIG. 1) or a structural frame, while the extension bracket 24 is configured to be securely fixed to the extendable thigh support 14 (shown in FIG. 1).

In order to assemble the extension system 16, lateral guide tracks, rails or edges 28 of the extension bracket 24 are slid into reciprocal grooves, rails or channels 30 of the securing bracket 22 in the direction of arrow A. The extension bracket 24 includes a latch member (not shown in FIG. 2) operatively connected to a lever 26. As discussed below, the latch member is configured to move through an adjustment guide track (not shown in FIG. 2) of the securing bracket 22. The lever 26 is configured to be engaged by a user in order to move the extension bracket 24 with respect to the securing bracket 22, and therefore, the extendable thigh support 14 (shown in FIG. 1) with respect to the lower body support seat 18 (shown in FIG. 1).

While FIG. 2 shows the securing bracket 22 positioned below the extension bracket 24, the extension system 16 may be oriented differently. For example, the securing bracket 22 may secured to the extension bracket 24 such that the securing bracket 22 is above the extension bracket 24.

Figure 3:
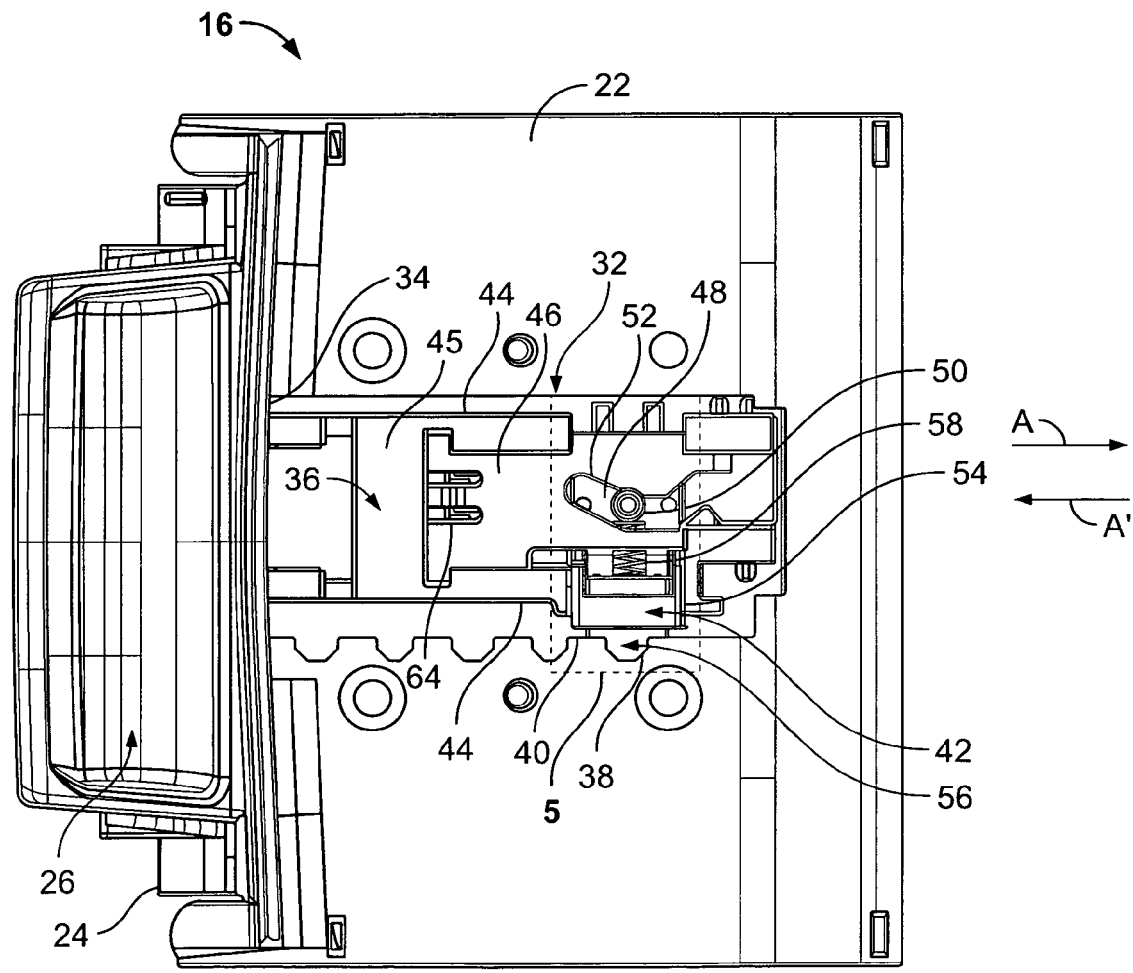
FIG. 3 illustrates a bottom plan view of an extension system according to an embodiment of the present invention.

FIG. 3 illustrates a bottom plan view of the extension system 16. An adjustment guide track 32 is formed through a center of the securing bracket 22. An end 34 of the securing bracket 22 is open in order to receive an arm track 36 of the extension bracket 24. The adjustment guide track 32 includes a series of recessed areas 38 formed on at least one lateral side. Each recessed area 38 is separated from another recessed groove or area 38 by a rib or tooth 40. As shown in FIG. 3, the recessed areas 38 and ribs 40 form a toothed track having a series of peaks and valleys (or teeth and gaps). While the recessed areas 38 are shown as semi-circles, the recessed areas 38 may be any shape, such as a triangle, rectangle or various other shapes and sizes. In general, the recessed areas 38 will conform to the shape of a reciprocal member formed on a latch member 42 of the extension bracket 24.

The arm track 36 includes lateral walls 44 securely fixed to the extension bracket 24. The lateral walls 44 are integrally formed with a strap 45 that spans between the lateral walls 44. A passage (not shown) is defined between the lateral walls 44 and the strap 45. A lever engaging arm 46 is slidably secured between the lateral walls 44 such that the lever engaging arm 46 is configured to slide through the arm track 36 in the directions of arrows A and A'.

The latch member 42 includes a main body 48 having a boss or knob 50 outwardly extending from a central area of the main body 48. The boss 50 is positioned within a curved channel 52 of the lever engaging arm 46.

A sleeve 54 is formed at an end of the latch member 42 proximate the recessed areas 38 and teeth 40 of the adjustment guide track 32. A latching protuberance or tip 56 extends through a channel (not shown in FIG. 3) of the sleeve 54. The latching protuberance 56 may be biased into a locking position away from the boss 50 through a spring 58. The spring 58 may abut against the boss 50, or may be positioned within a channel having a closed end formed in the main body 48. As shown in FIG. 3, the latch member 42 is in a locked position such that the latching protuberance 56 is secured within a recessed area 38 of the adjustment guide track 32.

Figure 4:
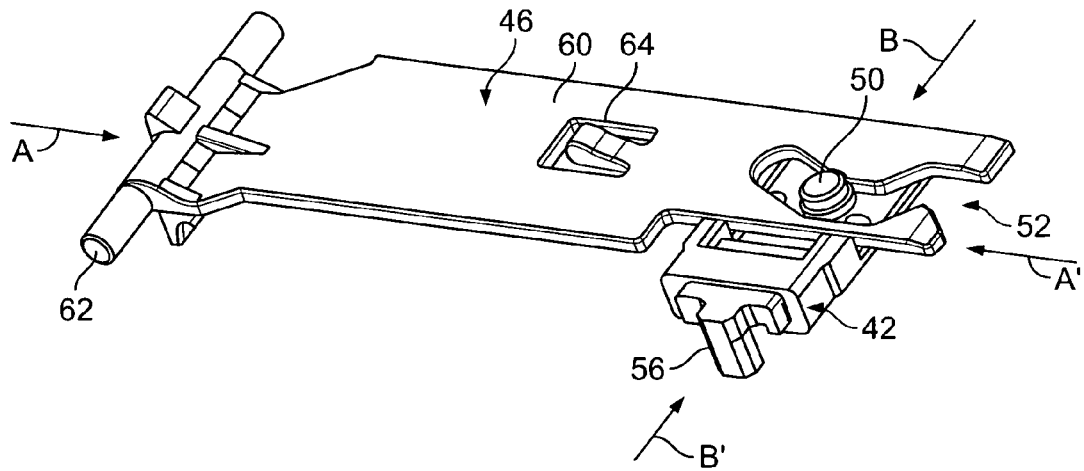
FIG. 4 illustrates an isometric view of a lever engaging arm operatively connected to a latch member according to an embodiment of the present invention.

FIG. 4 illustrates an isometric view of the lever engaging arm 46 operatively connected to the latch member 42. The lever engaging arm 46 includes a beam 60 configured to be positioned within the arm track 36 of the extension bracket 24 (shown in FIG. 3). A lever bar 62 extends from one end of the beam 60 and is configured to rotatably connect to the lever 26 (shown, e.g., in FIG. 2). Thus, rotation of the lever 26 about an axis causes the beam 60 to move in linear directions.

The curved channel 52 is formed through an end of the beam 60 that is opposite the lever bar 62. The boss 50 of the latch member 42 extends through the curved channel 52, and is therefore, slidably secured within the curved channel 52. As the beam 60 is moved through the directions denoted by arrows A and A', the curved nature of the curved channel 52 forces the boss 50, and therefore the latch member 42 in the directions of arrows B and B'. For example, if the beam 60 is moved (such as by movement of the lever 26) in the direction of arrow A, the curved channel moves over the boss 50. Because the lever engaging arm 46 is secured from lateral movement in the directions of arrows B and B', the curved notch 52 acts to move the boss 50 in the direction of arrow B'. Thus, the latch member 42, including the latching protuberance 56, moves in response to the movement of the boss 50.

The lever 26 (shown, e.g., in FIG. 2) may be spring-loaded, and configured to return to an at-rest position. Thus, when the lever is disengaged, the lever engaging arm retreats in the direction of A'. Consequently, the curved channel 52 moves over the boss 50 in a similar direction, thereby allowing the boss 50, and the rest of the latch member 42 to move outwardly in the direction of arrow B.

A stop member 64, such as a block, clip, clasp, hook, or the like may extend outwardly from the beam 60. The stop member 64 is configured to engage the strap 45 (shown in FIG. 3) of the arm track 36, or a lip, edge or the like formed on the extension bracket 24 (shown, e.g., in FIGS. 2 and 3) to limit movement of the beam 60 in a particular direction. The stop member 64 abuts against the strap 45 of the arm track 36 in order to prevent the beam 60 from moving out of the arm track 36.

Figure 5:
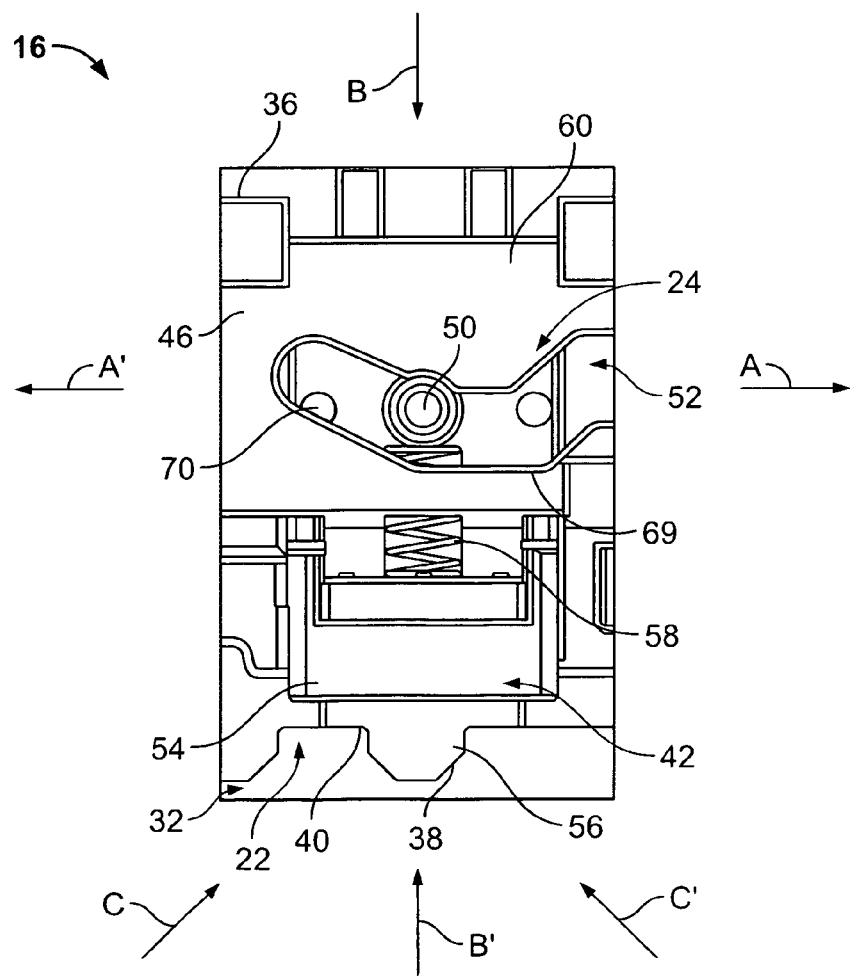
FIG. 5 illustrates a bottom plan view of a boss of a latch member positioned within a curved channel of a lever arm in a locked position according to an embodiment of the present invention.

FIG. 5 illustrates a bottom plan view of the boss 50 of the latch member 42 positioned within the curved channel 52 of the lever arm 46 in a locked position. In the locked position, the latching protuberance 56 is securely retained within a recessed area 38 of the adjustment guide track 32.

The curved channel 52 is configured such that in the locked position, the curved channel 52 and the boss 50 are at their closest position to the recessed area 38. In this position, the boss 50 is positioned within a relatively straight portion 69 of the curved channel 52. The curved channel 52 also includes an inwardly curved area 70 that curves away from the recessed area 38. Thus, as the lever engaging arm 46 moves in the direction of arrow A, the inwardly curved area 70 engages the boss 50. That is, the boss 50 moves into the inwardly curved area 70. Because the lever engaging arm 46 is fixed from shifting in the direction of arrows B and B', movement of the lever engaging arm 46 in the direction of arrow A causes the boss 50, and therefore the rest of the latch member 42 to move in the direction of arrow B'. Thus, the protuberance 56 moves out of the recessed area 38, and the extension bracket 24 may move relative to the securing bracket 22 in the direction of arrows A and A'. When the extension bracket 24 moves relative to the securing bracket 22, the tip of the protuberance 56 may slide over the teeth or ribs 40, thereby emitting a clicking sound and providing a tactile feel indicating to a user that the extension bracket 24 is moving to another position with respect to the securing bracket 22.

In the locked position, if external forces (such as during a collision) are exerted into the latch member 42 in the directions of arrows B', C, or C', the latch member 42 remains securely retained within the recessed area 38. Consequently, the securing bracket 22 remains in position with respect to the extension bracket 24. Thus, the extendable thigh support 14 (shown in FIG. 1) remains in the position chosen by the occupant.

When force is exerted into the latch assembly 42 in the direction of arrows B', C, or C', the force acts to urge the boss 50 into the boundary of the curved channel 52 defined by the beam 60 of the lever engaging arm 46. However, the boss 50 is trapped in the curved channel 52 by the interior edges of the beam 60. Thus, the boss 50 is prevented from moving in the direction of arrow B' by the edges or walls of the beam 60 that define the curved channel 52. As such, the latching protuberance 56 remains secured within the recessed area 38. As a side note, a force exerted in the direction of arrow B (or having any component of an exerted force in the direction of arrow B) keeps the protuberance firmly secured within the recessed area 38.

The latch member 42 may also include a breakaway feature in order to prevent damage to the extension system. As shown in FIGS. 5, the protuberance 56 is biased in the direction of arrow B by the spring 58. If force is exerted in the latch member 42 in the direction of arrows B', C, or C' that exceeds a pre-configured level (depending on the force constant of spring 58), the protuberance 56 may retreat within the sleeve 54. That is, the force exerted in the latch member 42 may be so great as to overcome the force constant of the spring 58. As such, the protuberance 56 may be forced to retreat through the sleeve 54, thereby compressing the spring 58, and moving out of the recessed area 38. When the external force is no longer applied, the spring 58 extends back to its original position, thereby forcing the protuberance 56 back into the recessed area 38. The breakaway feature described above ensures that the protuberance 56 does not snap off of the latching member 42 and prevents the adjustment guide track 32 from being warped when a force of great magnitude is exerted into the extension bracket 24.

Figure 6:
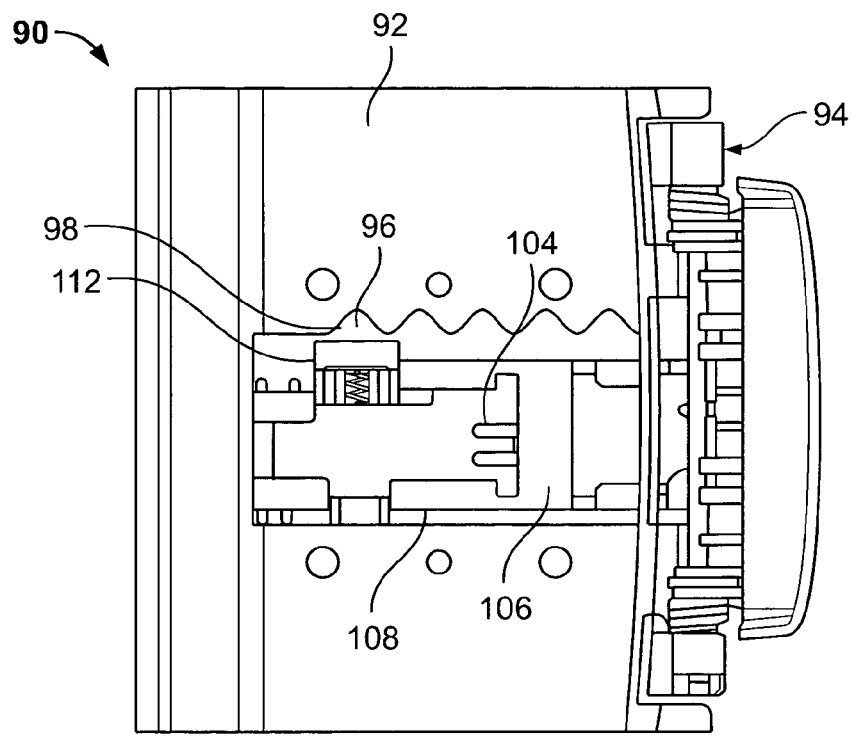
FIG. 6 illustrates a bottom plan view of an extension system in a locked position according to an embodiment of the present invention.

FIG. 6 illustrates a bottom plan view of an extension system 90 in a locked position according to an embodiment of the present invention. The extension system 90 includes a securing bracket 92 connected to an extension bracket 94, similar to the extension system 16 discussed above with respect to FIGS. 1-5. As shown in FIG. 6, a latching member 112 includes a latching protuberance 96 that is securely retained within a recessed area 98 of the securing bracket 92. The latching protuberance 96 may be a wedge, tooth, semi-circle, rectangle, or the like secured within a reciprocal recessed area 98.

Figure 7:
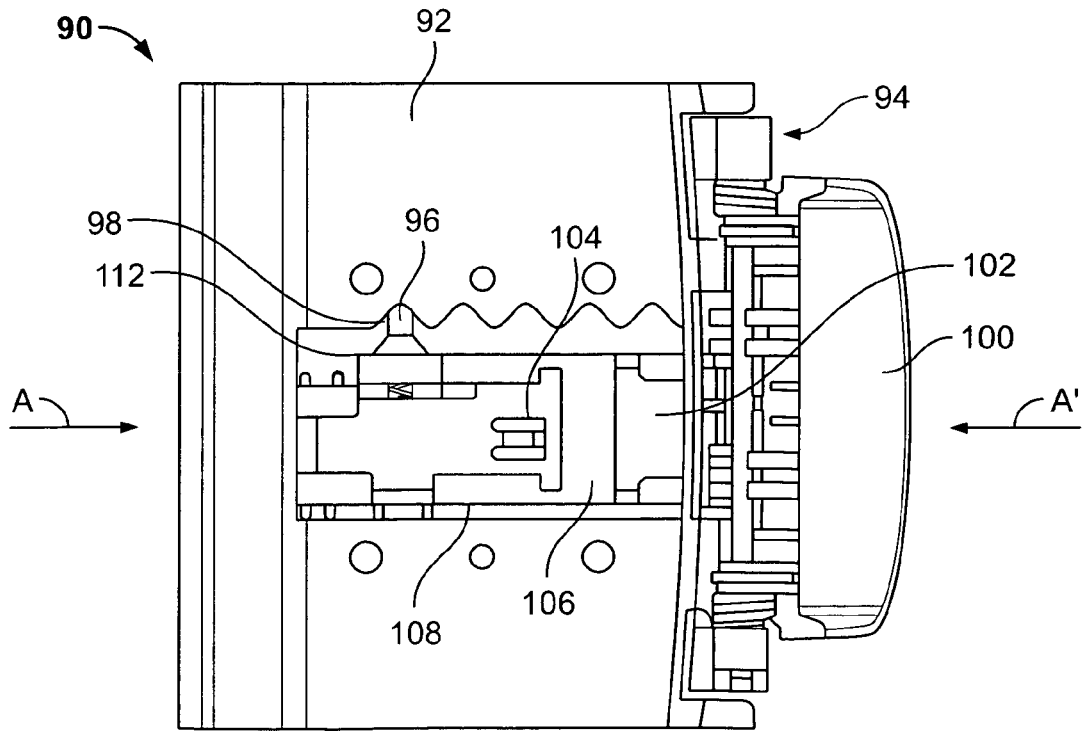
FIG. 7 illustrates a bottom plan view of an extension system in an unlocked position according to an embodiment of the present invention.

FIG. 7 illustrates a bottom plan view of the extension system 90 in an unlocked position. In order to unlock the extension system, the lever 100 is actuated to move the lever engaging arm 102 so that the protuberance 96 moves out of the recessed area 98. Thus, the extension bracket 94 may be moved relative to the securing bracket 92 in the directions denoted by arrows A and A'. Once the extension bracket 94 is moved to a desired location, the lever 100 is disengaged, thereby allowing the lever engaging arm 102 to move back in the direction of arrow A and the protuberance 96 to be urged back into a recessed area 98. As shown in FIGS. 6 and 7, the lever engaging arm 102 includes a stop block or clip 104 that is prevented by a strap or sleeve 106 of arm track 108 from allowing the lever engaging arm 102 ejecting out of the arm track 108.

Figure 8:
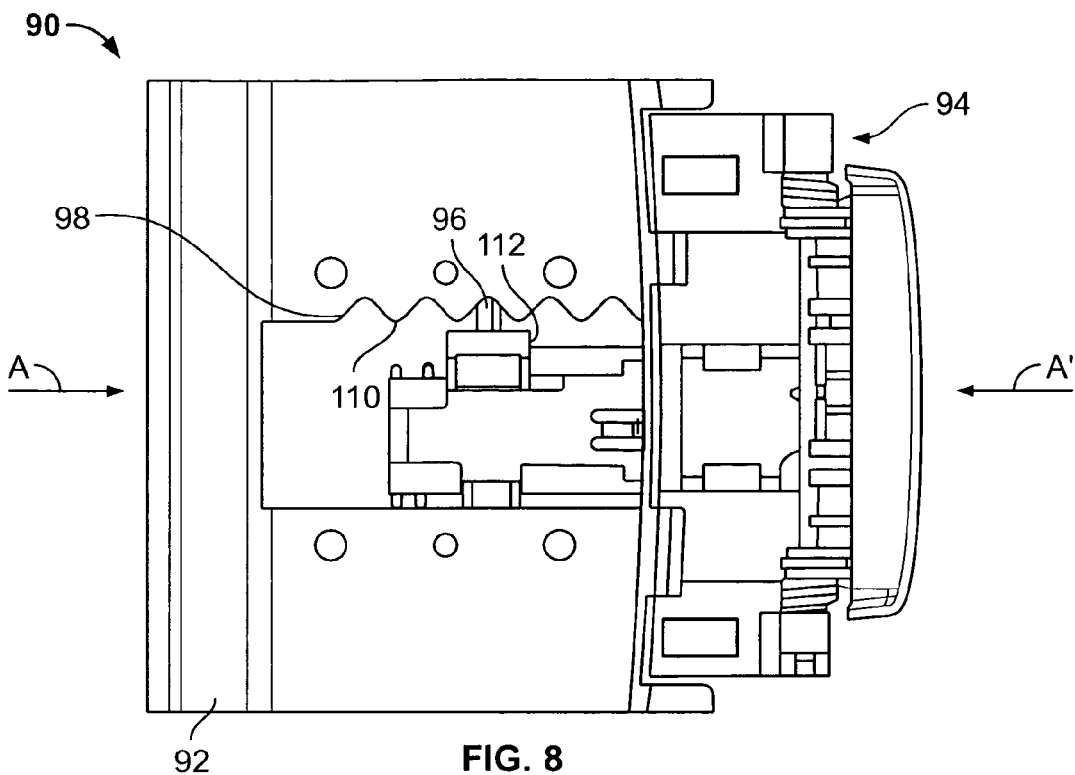
FIG. 8 illustrates a bottom plan view of an extension system in a break-away position according to an embodiment of the present invention.

FIG. 8 illustrates a bottom plan view of the extension system 90 in a break-away position. When a great enough force is exerted into the extension system 90 in the direction of arrows A or A', the protuberance 96 is slid out of the recessed area 98. As the protuberance 98 is forced in the direction of arrows A or A, the ribs 110 overcome the force constant of the spring within the latch member 112 and force the protuberance 96 to recede into the latch assembly 112. For example, a driver may be able to exert sufficient force to move the protuberance 96 into a breakaway position when the driver's thighs are pinched between a thigh extender and a steering wheel. By pushing away from the steering wheel, the driver may force the protuberance 96 into the breakaway position, thereby allowing the thigh extender to be moved to a comfortable position, by virtue of the extension bracket 94 moving with respect to the securing bracket 92.

Figure 9:
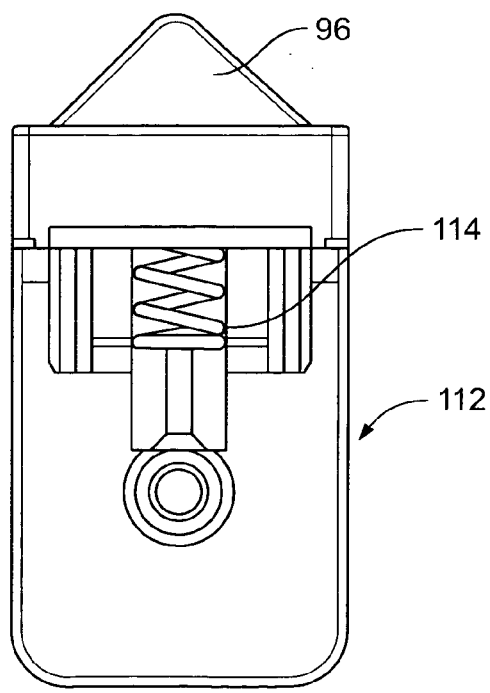
FIG. 9 illustrates a bottom plan view of a latch member in a locked position according to an embodiment of the present invention.

FIG. 9 illustrates a bottom plan view of the latch member 112 in a locked position. The protuberance 96 is outwardly biased by the spring 114. In this position, the protuberance 96 is urged into a reciprocal recessed area 98, such as shown in FIG. 6.

Figure 10:
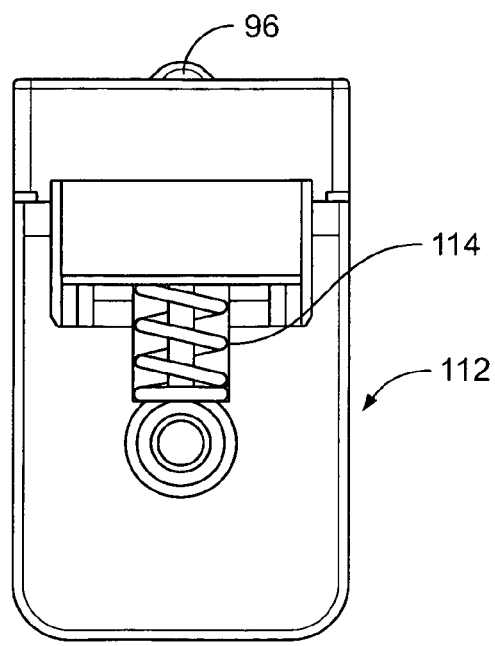
FIG. 10 illustrates a bottom plan view of a latch member in a break away position according to an embodiment of the present invention.

FIG. 10 illustrates a bottom plan view of the latch member 112 in a break away position. Referring to FIGS. 8 and 10, the protuberance 96 retreats into the latch member 112 when a sufficient amount of force is exerted into the extension system 90. Forced movement of the protuberance 96 over the ribs 110 forces the protuberance 96 into the latch member 112, thereby overcoming the force constant of the spring 114 and compressing the spring 114.

Thus, embodiments of the present invention provide a thigh extender system that provides a comfortable fit for a driver or passenger. Further, embodiments of the present invention provide a thigh extender system that remains in position after an occupant has adjusted the seat to his/her preference, even during a collision when external forces are exerted into the vehicle seat.

While various spatial terms, such as upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A thigh extender system for a vehicle seat, comprising:
a securing bracket configured to be secured to structure within a vehicle, said securing bracket comprising an adjustment guide track having a plurality of recessed grooves separated by a plurality of teeth;
an extension bracket movably secured to said securing bracket, said extension bracket comprising a fixed arm track; a lever engaging arm positioned within said arm track; and a lever operatively connected to said lever engaging arm, said lever engaging arm having a curved channel formed therein; and
a latching member comprising a boss and a protuberance, said boss being positioned within said curved channel, said protuberance being configured to be retained within each of said recessed grooves, wherein movement of said lever engaging arm in a first linear direction causes said latching member to move in a second linear direction that is perpendicular to said first linear direction.

2. The thigh extender system of claim 1, wherein said curved channel prevents said boss from movement in said second linear direction when said latching member is in a locked position in which said protuberance is retained within one of said recessed grooves.

3. The thigh extender system of claim 2, wherein movement of said lever engaging arm in said first linear direction causes said boss to move through said curve channel causing said protuberance to move away from said one of said recessed grooves so that said protuberance is in an unlocked position.

4. The thigh extender system of claim 1, further comprising a biasing member operatively connected to said protuberance, wherein said biasing member exerts a force into said protuberance so that said protuberance extends outwardly from said latching member, and wherein said protuberance is moved into a breakaway position in which said protuberance retracts into said latching member when said protuberance is forced inward.

5. The thigh extender system of claim 4, wherein said biasing member is a spring, and wherein said spring is compressed in said breakaway position.

6. The thigh extender system of claim 4, wherein said extension bracket is able to move with respect to said securing bracket in said first linear direction when said protuberance is in said breakaway position.

7. The thigh extender system of claim 1, wherein said lever engaging arm comprises a stop member configured to engage a portion of said arm track to limit movement of said lever engaging arm in said first linear direction.

8. A thigh extender system for a vehicle seat, comprising:
a securing bracket comprising a toothed guide track;
an extension bracket movably secured to said securing bracket; said extension bracket comprising a lever engaging arm and a lever operatively connected to said lever engaging arm, said lever engaging arm having a curved channel formed therein; and
a latching member comprising a main body having a knob extending from a surface of said main body, and a protruding tip extending from an end of said main body, said knob being positioned within said curved channel, said protruding tip being configured to be retained by said toothed guide track, wherein movement of said lever engaging arm in a first linear direction causes said latching member to move in a second linear direction that is perpendicular to said first linear direction.

9. The thigh extender system of claim 8, wherein said extension bracket further comprises a fixed arm track, said lever engaging arm being positioned within said fixed arm track, wherein said fixed arm track prevents said lever engaging arm from moving in said second linear direction.

10. The thigh extender system of claim 8, wherein said curved channel prevents said knob from moving in said second linear direction when said latching member is in a locked position in which said protruding tip is retained within said toothed guide track.

11. The thigh extender system of claim 10, wherein movement of said lever engaging arm in said first linear direction causes said knob to move through said curved channel causing said knob to move away from said toothed guide track into an unlocked position.

12. The thigh extender system of claim 8, further comprising a biasing member operatively connected to said protruding tip, wherein said biasing member exerts a force into said protruding tip so that said protruding tip extends outwardly from said latching member, and wherein said protruding tip is moved into a breakaway position in which said protruding tip retracts into said latching member when said protruding tip is forced inward.

13. The thigh extender system of claim 12, wherein said biasing member is a spring, and wherein said spring is compressed in said breakaway position.

14. The thigh extender system of claim 12, wherein said extension bracket is able to move with respect to said securing bracket in said first linear direction when said protruding tip is in said breakaway position.

15. The thigh extender system of claim 8, wherein said lever engaging arm comprises a stop member configured to engage a portion of said extension bracket to limit movement of said lever engaging arm in said first linear direction.

16. A thigh extender system for a vehicle seat, comprising:
a lower seat;
a back rest connected to said lower seat;
an extendable seat portion movably connected to said lower seat;

a securing bracket secured to said extendable seat portion, said securing bracket comprising an adjustment guide track having a toothed guide track;

an extension bracket movably secured to said securing bracket; said extension bracket comprising a lever engaging arm positioned with a fixed arm track and a lever operatively connected to said lever engaging arm, said lever engaging arm having a curved channel formed therein; and a latching member comprising a main body having a knob extending from a surface of said main body, and a protuberance extending from an end of said main body, said knob being positioned within said curved channel, said protuberance being configured to be retained by said toothed guide track, wherein movement of said lever engaging arm in a first linear direction causes said latching member to move in a second linear direction that is perpendicular to said first linear direction, said curved channel preventing said knob from moving in said second linear direction when said latching member is in a locked position in which said protuberance is retained within said toothed guide track, wherein movement of said lever engaging arm in said first linear direction causes said knob to move through said curved channel causing said knob to move away from said toothed guide track into an unlocked position.

17. The thigh extender system of claim 16, further comprising a biasing member operatively connected to said protuberance, wherein said biasing member exerts a force into said protuberance so that said protuberance extends outwardly from said latching member, and wherein said protuberance is moved into a breakaway position in which said protuberance retracts into said latching member when said protuberance is forced inward by said toothed guide track.

18. The thigh extender system of claim 17, wherein said extension bracket is able to move with respect to said securing bracket in said first linear direction when said protuberance is in said breakaway position.

19. The thigh extender system of claim 17, wherein said lever engaging arm comprises a stop member configured to engage a portion of said extension bracket to limit movement of said lever engaging arm in said first linear direction.

* * * * *